United States Patent
Basham et al.

(10) Patent No.: US 6,931,478 B2
(45) Date of Patent: Aug. 16, 2005

(54) IMPLICIT ADDRESSING SEQUENTIAL MEDIA DRIVE WITH INTERVENING CONVERTER SIMULATING EXPLICIT ADDRESSING TO HOST APPLICATIONS

(75) Inventors: Robert Beverley Basham, Aloha, OR (US); Leonard George Jesionowski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 502 days.

(21) Appl. No.: 10/071,807

(22) Filed: Feb. 6, 2002

(65) Prior Publication Data

US 2003/0149829 A1 Aug. 7, 2003

(51) Int. Cl.[7] ............................................. G06F 12/00
(52) U.S. Cl. ...................... 711/4; 711/100; 711/202; 711/1
(58) Field of Search ............................. 711/100, 200, 711/202, 4, 205, 206, 207, 1

(56) References Cited

U.S. PATENT DOCUMENTS

| | | | | |
|---|---|---|---|---|
| 4,126,897 A | * | 11/1978 | Capowski et al. | 710/3 |
| 5,657,442 A | * | 8/1997 | Groves | 714/28 |

* cited by examiner

Primary Examiner—Kimberly McLean-Mayo
(74) Attorney, Agent, or Firm—John C. Kennel

(57) ABSTRACT

A converter is utilized with at least one implicit addressing sequential media device to simulate explicit addressing sequential media device performance from the perspective of host applications. Responsive to receiving explicit addressing read/write commands from the host application, the converter converts the explicit addressing read/write commands into implicit addressing read/write commands and passes the implicit addressing read/write commands through to the device. Optionally, responsive to device capability queries from a host application, the converter reports that the device utilizes explicit addressing. As another option, responsive to receiving commands other than explicit addressing read/write commands from the application host, the converter examines the commands to monitor sequential media address, and relays the commands to the device substantially free of any modification.

21 Claims, 3 Drawing Sheets

IMPLICIT ADDRESSING SEQUENTIAL MEDIA DRIVE WITH INTERVENING CONVERTER SIMULATING EXPLICIT ADDRESSING TO HOST APPLICATIONS

BACKGROUND OF THE INVENTION

1. Field of the Invention

The present invention relates to sequential data storage machines such as magnetic tape drives. More particularly, the invention concerns the modification of an implicit addressing sequential media drive by adding a hardware and/or software converter in order to simulate performance of an explicit addressing sequential media drive from the perspective of host applications.

2. Description of the Related Art

In the past, small computer system interface (SCSI) tape drives have used "stateless" commands. With stateless commands, also called "implicit addressing" commands, knowledge of current addressing is implied. Stated another way, an implicit Read, Write, or other position command consists of a command to start the operation at the current position without explicitly starting at a particular address. The host application or storage manager issues tape access and positioning commands that are relative. The following is an example of a series of implicit addressing commands: WRITE LENGTH 2, WRITE LENGTH 2, WRITE LENGTH 2. The components of each command include a write instruction and the number of units of data to be written.

Accordingly, it is crucial to keep track of the current write location, since the commands only specify a location relative to the last command. Many failures are difficult to recover from since the host application or device driver does not always know exactly where the drive is positioned after a failure. Accordingly, implicit addressing is limited because failed SCSI commands may leave the host without knowledge of the current tape position. Low level interconnect failures that are passed up to the command layer can result in failed backup jobs with retry of the entire job potentially taking hours, if possible at all. Another potential problem is that commands can be misordered by the time they reach the tape drive, causing the tape drive to apply them incorrectly.

Proposals are being developed for technical standards under which new tape drives will use explicit addressing. With explicit addressing, the host application or storage manager will issue tape access and positioning commands that specify the desired address. The following is an example of a series of explicit addressing commands that would carry out the same write sequence as the implicit write commands shown above: WRITE ADDRESS 0 LENGTH 2, WRITE ADDRESS 2 LENGTH 2, WRITE ADDRESS 4 LENGTH 2. Although explicit addressing will not offer random access, it will offer the advantage of making it easier to keep track of the location on tape that is being written. Explicit addressing will help avoid the situation where, as with implicit addressing, an inadvertent error in tracking the current tape location causes the storage subsystem to become confused as to where data is actually being written.

Although the explicit addressing tape drives are expected to constitute a significant advance, engineers at International Business Machines Corp. ("IBM") are still researching different tape storage approaches to even better serve their customers. In this respect, IBM engineers have recognized that one byproduct of the evolution toward explicit addressing might be the abandonment of costly and otherwise useful implicit addressing drives. Host applications and intermediate storage systems designed to operate with explicit addressing tape drives are not compatible with the "legacy" implicit addressing tape drives. In some cases, customers may wish to purchase the latest storage subsystem but not abandon their legacy implicit addressing tape drives. For these customers, then, the state of the art is not completely adequate due to certain unsolved problems.

SUMMARY OF THE INVENTION

Broadly, the present invention concerns the modification of an implicit addressing sequential media device by adding a hardware and/or software converter in order to simulate performance of an explicit addressing sequential media device from the perspective of host applications. Responsive to receiving explicit addressing read/write commands from the host application, the converter translates the explicit addressing read/write commands into implicit addressing read/write commands and passes the implicit addressing read/write commands through to the sequential media device. Optionally, responsive to drive capability queries from a host application, the converter reports that the drive utilizes explicit addressing. As another option, responsive to receiving commands other than explicit addressing read/write commands from the application host, the converter examines the commands to monitor sequential media position, and relays the commands to the drive substantially free of any modification.

The foregoing features may be implemented in a number of different forms. For example, the invention may be implemented to provide a method to interface an implicit addressing sequential media device with host applications designed for explicit addressing sequential media devices. In another embodiment, the invention may be implemented to provide an apparatus such as a storage system interface incorporating a converter with such functionality, or such a converter alone. In still another embodiment, the invention may be implemented to provide a signal-bearing medium tangibly embodying a program of machine-readable instructions executable by a digital data processing apparatus to achieve the converter described herein. Another embodiment concerns logic circuitry having multiple interconnected electrically conductive elements configured to provide the converter explained herein.

The invention affords its users with a number of distinct advantages. Chiefly, the invention enables people to continue to use their implicit addressing sequential media drives (or other devices) with storage subsystems that are designed to operate with explicit addressing sequential media drives. Otherwise, these legacy drives would become out of date. This avoids the significant investment that would otherwise be required to purchase explicit addressing sequential media drives. Furthermore, the invention helps preserve the market for implicit address media drives because customers need not fear that their drives will rapidly go out of date. This is because the invention's converter insulates the legacy sequential media drives from changes in format, standards, and other technological changes occurring to the storage subsystem.

As another advantage, this invention allows implicit addressing drives to benefit from new tape features most easily enabled by an explicit addressing command set. An example of this is command queuing, in which incoming commands are collected and processed from a queue. This avoids having to reject earlier-arriving commands that seek to write to later addresses on tape, because they would otherwise create a gap in data. Command queuing provides a particular advantage when there is a long distance between the hosts and the sequential media devices. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings.

Hardware Components & Interconnections
Overall Structure

Figure 1:
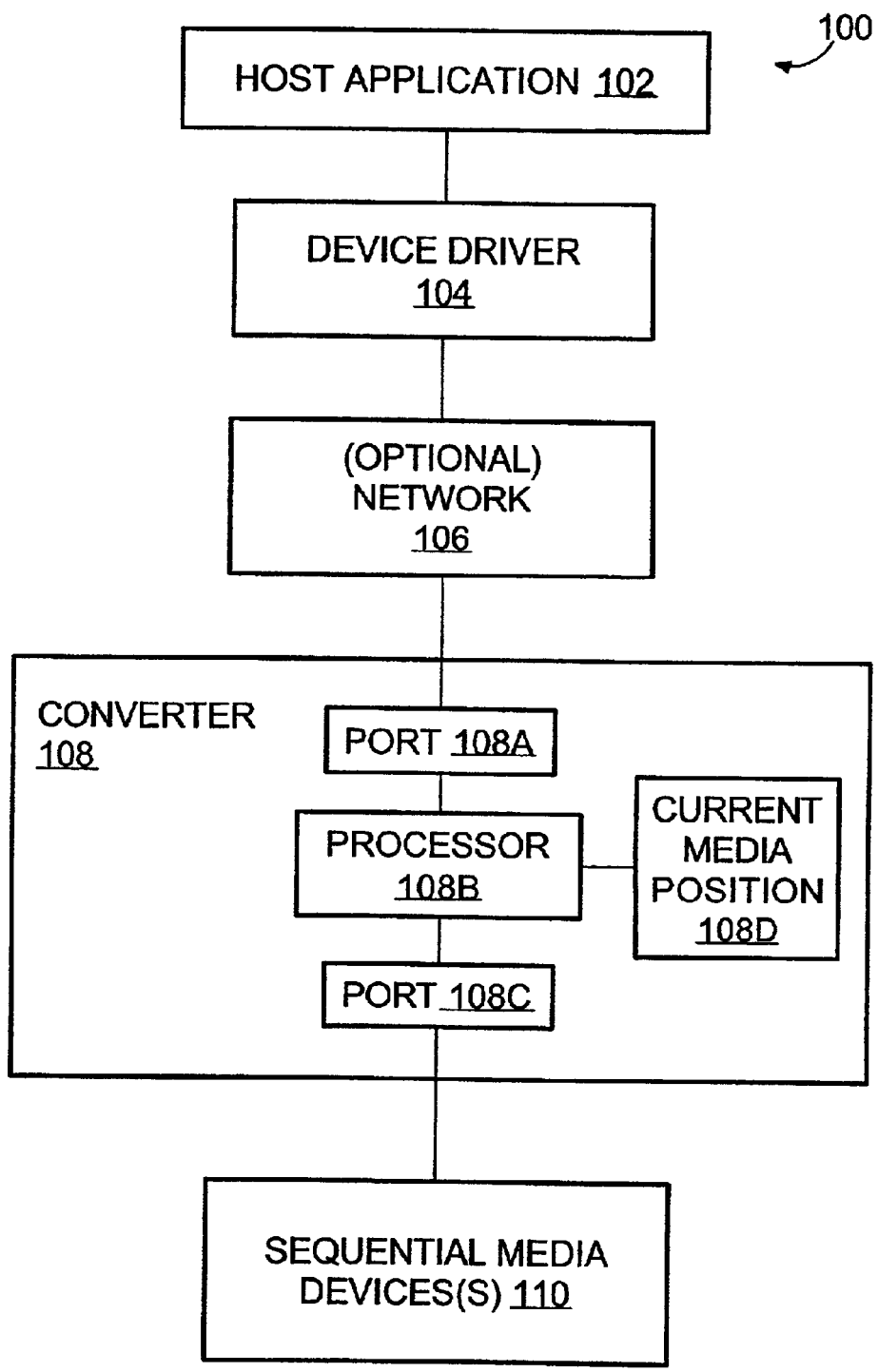
FIG. 1 is a block diagram of the hardware components and interconnections of a sequential media storage system according to the invention.

FIG. 1 shows an operating environment 100 to illustrate one exemplary implementation of the invention for purposes of explanation. Ordinarily skilled artisans will recognize that the invention may be implemented with various software, hardware, and architecture that varies from the illustrated example. The environment 100 includes at least one of each of the following: host application 102, device driver 104, network 106, converter 108, and sequential media device 110. In one embodiment, the sequential media devices 110 comprise one or more sequential media drives such as tape drives.

Host

The host application 102 comprises a physical host machine, software program, network, operator terminal, storage subsystem, hierarchical storage manager, user application program, or other source of various storage instructions directed at the sequential media device 110. Some examples of these instructions include Read commands, Write commands, Reposition commands, etc. The host application 102 provides data to be written by the device 110, receives data read by the devices 110, and communicates with the device 110 as needed to sustain workability.

Device Driver

The device driver 104 is a software component that brokers between the host application 102 and the media devices 110. The device driver 104 frees the host application 102 from various details about the operation of the network 106. The device driver 104 may be part of an operating system at the host 102, a product associated with the network 106, the application 102, or a product from a gateway vendor, for example. Still, the invention may operate without the device driver 104, and this component is therefore optional. One example of the device driver 104 is an AIX operating system component (102) that is provided with purchase of an IBM machine type 3590 tape drive (110).

Network

Depending upon the desired storage configuration, the optional network 106 may be used or omitted. Some useful examples of the network 106 include a storage area network, or another arrangement of switches, routers, and/or gateways. Some other examples include a local area network (LAN), wide area network (WAN), token ring, or other communications link. Still another example is a simpler product such as a media controller card.

Converter

The converter 108 is a new component added to the environment 100 in order to implement the functionality of the present invention. The converter may comprise, for example, a router/gateway or another known construct utilized to convert between different protocols. For example, the converter 108 may convert between iSCSI or SCSI protocol from the network 106 and Fibre Channel protocol at the device 110. One particular example of the converter 108 is the IBM machine type 2108 model G07 product. In the typical implementation, a router/gateway only manipulates the carrier wrapper, that is, the format of commands passing through the router/gateway. As discussed in greater detail below, the converter 108 additionally changes the contents of commands passing through it. Namely, the addressing scheme is changed. More particularly, the converter 108 mimics performance of an explicit addressing sequential media drive from the perspective of the host application 102, even though the device 110 actually utilizes implicit addressing. The converter 108 also translates explicit addressing commands from the host application 102 into implicit addressing commands compatible with the device 110.

FIG. 1 shows one example of the converter 108, although many different arrangements are possible. The converter 108 includes an input port 108a, output port 108c, and a processor 108b. The processor 108b tracks the current tape position (address) using the current media position record 108d. Namely, the converter 108 includes a record 108d of the current media position, in order to ease the implementation of explicit addressing commands on the implicit addressing device 110. In one example, the current media position comprises the relative position between a tape read/write head and the magnetic tape media. The record 108a may comprise a register, byte, page, firmware location, software construct, hardware site, or other means to keep track of the address or other current logical write position of the sequential media device 110.

The ports 108a, 108c may comprise connectors, busses, intelligent communications devices, channels, optical links, wireless links, planar connections, host bus adapters, gigabit interface connectors (GBICs), or any other construct as appropriate to the application at hand. For example, the ports 108a, 108c may comprise circuit elements to implement low level device drivers, etc. The processor 108b comprises a digital data processor, which may be implemented in various ways, as discussed below. As an alternative to the previously described embodiment of converter 108, this component may also be implemented as a software component of a host 102, network 106, or device 110.

In one embodiment, as discussed above, there is a single instance of the converter 108. In another embodiment, the system 100 includes multiple converters 108 between the host application 102 and sequential media devices 110. The converters 108 may use separate device drivers 104 and networks 106, or some or all of these components may be shared among converters 108. Where multiple converters 108 are utilized, the converters are suitably coupled to exchange information sufficient for all converters to monitor current media position of the device 110.

Sequential Media Device

In one embodiment, the sequential media device 110 comprises one or more drives to access removable, sequentially accessible media such as magnetic tape, optical tape, etc. For ease of illustration, the present discussion utilizes magnetic tape. In this context, one example of device 110 is an IBM machine type 3590 product. Such a drive may include one tape drive, as discussed, or an arrangement of multiple drives. In an alternative embodiment, the sequential media devices comprise virtual sequential media drives rather than physical tape drives. Such a virtual device may comprise, for example, a storage manager, controller, interface, or other processing component that conducts communications as if it were a sequential media drive, yet implements received storage instructions on DASD or other non-sequential media, or forwards such instructions to a non-sequential storage controller to be implemented therein. In this sense, sequential media "devices" as discussed herein may comprise actual or virtual sequential media storage machines.

Exemplary Digital Data Processing Apparatus

As mentioned above, the converter 108 may be implemented in various forms. As one example, the converter 108 may comprise a digital data processing apparatus, as exemplified by the hardware components and interconnections of the digital data processing apparatus 200 of FIG. 2.

The apparatus 200 includes a processor 202, such as a microprocessor, personal computer, workstation, or other processing machine, coupled to a storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, battery backup RAM, EEPROM, one or more magnetic data storage disks such as a "hard drive", a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204, 206, and/or 208 may be provided on-board the processor 202, or even provided externally to the apparatus 200.

Logic Circuitry

In contrast to the digital data processing apparatus discussed above, a different embodiment of the invention uses logic circuitry instead of computer-executed instructions to implement the converter 108. Depending upon the particular requirements of the application in the areas of speed, expense, tooling costs, and the like, this logic may be implemented by constructing an application-specific integrated circuit ("ASIC") having thousands of tiny integrated transistors. Such an ASIC may be implemented with CMOS, TTL, VLSI, or another suitable construction. Other alternatives include a digital signal processing chip ("DSP"), discrete circuitry (such as resistors, capacitors, diodes, inductors, and transistors), field programmable gate array ("FPGA"), programmable logic array ("PLA"), and the like.

Operation

Having described the structural features of the present invention, the operational aspect of the present invention will now be described. As mentioned above, the operational aspect of the invention generally involves modifying an implicit addressing sequential media drive by adding a hardware and/or software converter in order to simulate performance of an explicit addressing sequential media drive from the perspective of host applications.

Signal-Bearing Media

Figure 2:
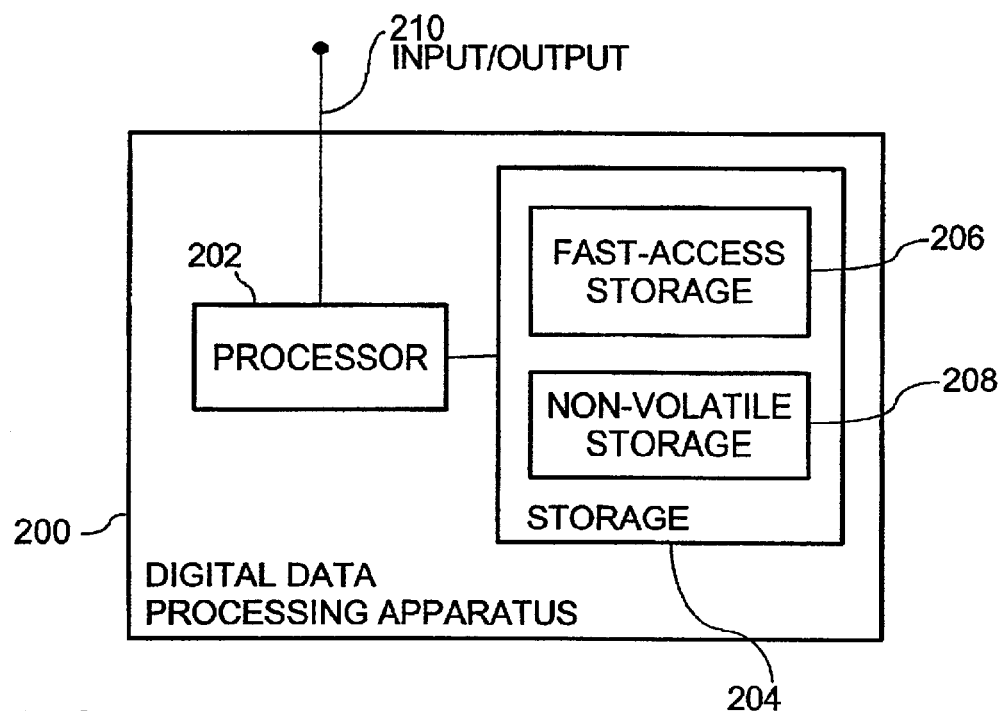
FIG. 2 is a block diagram of a digital data processing machine according to the invention.
Figure 3:
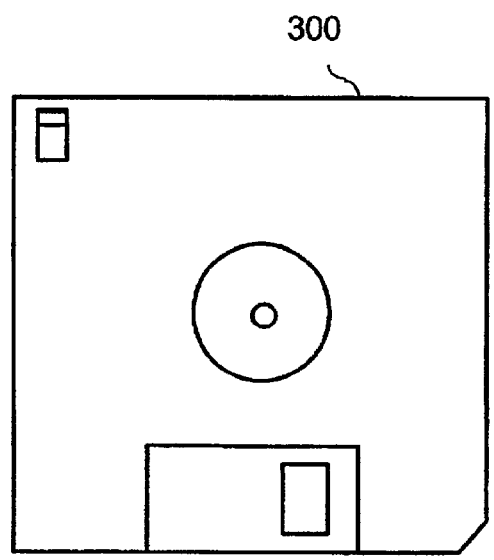
FIG. 3 shows an exemplary signal-bearing medium according to the invention.

Wherever the functionality of the invention is implemented using machine-executed program sequences, these sequences may be embodied in various forms of signal-bearing media. In the context of FIG. 2, this signal-bearing media may comprise, for example, the storage 204 or another signal-bearing media, such as a magnetic data storage diskette 300 (FIG. 3), directly or indirectly accessible by a processor 202. Whether contained in the storage 206, diskette 300, or elsewhere, the instructions may be stored on a variety of machine-readable data storage media. Some examples include direct access storage (e.g., a conventional "hard drive", redundant array of inexpensive disks ("RAID"), or another direct access storage device ("DASD")), serial-access storage such as magnetic or optical tape, electronic non-volatile memory (e.g., ROM, EPROM, or EEPROM), battery backup RAM, optical storage (e.g., CD-ROM, WORM, DVD), paper "punch" cards, or other suitable signal-bearing media including analog or digital transmission media and analog and communication links and wireless communications. In an illustrative embodiment of the invention, the machine-readable instructions may comprise software object code assembled from assembly language, compiled from a language such as "C,", etc.

Logic Circuitry

In contrast to the signal-bearing medium discussed above, some or all of the invention's functionality may be implemented using logic circuitry, instead of using a processor to execute instructions. Such logic circuitry is therefore configured to perform operations to carry out the method of the invention. The logic circuitry may be implemented using many different types of circuitry, as discussed above.

Overall Sequence of Operation

Figure 4:
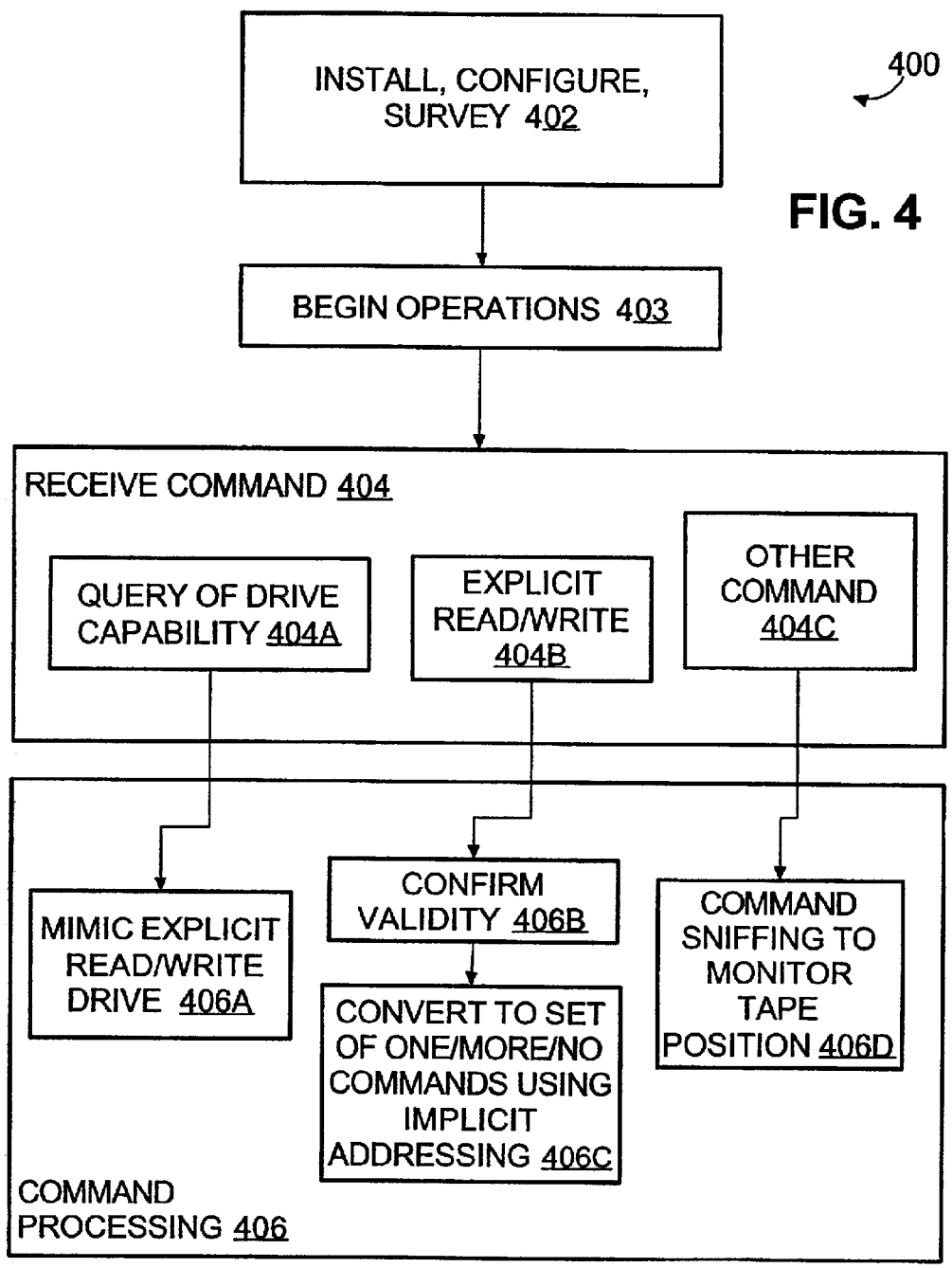
FIG. 4 is a flowchart of an operational sequence for interfacing an implicit addressing sequential media device with host applications using explicit addressing, according to the invention.

FIG. 4 shows a sequence 400 to illustrate one example of the method aspect of the present invention. For ease of explanation, but without any intended limitation, the example of FIG. 4 is described in the context of the storage environment 100 described above. Also for ease of discussion, the present illustration concerns an embodiment utilizing a single, physical tape drive as the device 110. The sequence 400 is initiated in step 402, when technicians install the device driver 104, network 106, and converter 108. Installation entails electrically coupling the network 106 between the machine(s) running the host application 102 and the converter 108, and coupling the converter 108 to the drive 110. In cases where the converter 108 is integrated into the network 106, the network 106 is coupled directly to the drives 110. Configuration of the network 106 entails installing and/or activating the device driver 104 and any necessary software configuration steps to prepare the driver 104, network 106, and converter 108 for operation, some or all of which may be known to those skilled in the art. Also as part of step 402, the converter 108 conducts a survey to identify the number, type, and other properties of the attached drives 110. When step 402 completes, operation of the converter 108 begin (step 403).

Steps 404, 406 describe the events that occur when the converter 108 receives and then processes a command from the host application 102 relayed by the network 106. In step 404, the converter 108 receives a host application command.

"Commands" comprise instructions for the drive 110 to report its capability, conduct a read and/or write operation ("read/write operation"), reposition the tape, allow changes to its operating mode, report status, and the like. The drive 110 may recognize other commands as well.

In one case (step 404a), the converter 108 in step 404 receives a query command requesting a report of the drive's capability, properties, type, model, etc. In this case, the converter 108 conditions the drive's response to assert that the drive utilizes explicit addressing (step 406a).

In another case (step 404b), the converter 108 in step 404 receives an explicit addressing read/write command (also called a media access command). In this case, the converter 108 proceeds to confirm the command's validity against predetermined syntax rules, etc. (step 406b). Step 406b may also impose other requirements, such as requiring that any write command is not valid unless it is directed to the beginning of tape or current tape position (unless it directs a full re-write of the most recently written data). The reason for these requirements is because most tape technologies are absolutely sequential in their ability to write data and the misordering of a write operation cannot always be easily repaired.

If the command is valid, the converter 108 converts the explicit addressing read/write command into an appropriate implicit read/write command (step 406c). Explicit addressing read/write commands include a command (such as Read or Write), an address to perform the read/write, and a length of data to be written/read. Conversion requires generation of the following resultant commands:

1. POSITIONING COMMAND (as required). Positioning commands work to change the relative position between the tape and the drive's read/write head, thereby changing the current logical block number being accessed by the drive 110. Positioning commands may be needed, for example, when the sequential media device's current position (e.g., logical block number) does not match the explicit address of the explicit logical block address command. Some other examples where repositioning may be needed include repositioning over previously written file or other end marks to start writing (appending) new data, performing a write retry after a timeout or error, writing over old data to be discarded, etc. In one embodiment, positioning may be achieved by performing a LOCATE command with the appropriate block number to reposition the tape drive before issuing the converted command.

2. IMPLICIT ADDRESS COMMAND. The implicit address command is generated by removing the address from the explicit address command and retaining the command and data length.

3. READ POSITION COMMAND (as required). The Read Position command is needed if the explicit addressing command is a relative command or another reason makes it difficult to determine current tape position. For instance, a Read Position command may be used whenever the tape drive 110 reports any Check Condition error.

The following example provides a specific example of the explicit addressing command conversion of step 406c. Upon receiving the commands WRITE ADDRESS 4 LENGTH 10, WRITE ADDRESS 0 LENGTH 1, WRITE ADDRESS 1 LENGTH 3, the converter implements them as the following commands, in order: WRITE LENGTH 1, WRITE LENGTH 3, WRITE LENGTH 10.

After the conversion, the converter 108 passes the converted, now-implicit-addressing command to the drive 110. If the command is a Write command, the converter 108 also updates the record of current media position 108d to show the tape drive's current address, relative head position, or other indication of logical write position.

In an optional enhancement to the invention, the converter 108 may perform command queuing to avoid having to reject earlier-arriving commands that seek to write to later addresses on tape (because they would otherwise create a gap in data). In this embodiment, the converter 108 accumulates a number of arriving explicit addressing commands and re-orders them according to their stated addresses before the conversion of step 404c. Alternatively, the converter 108 may convert the commands to implicit addressing first, then re-order them according to their formerly stated explicit address. The converter 108 may accumulate commands to the limit of a buffer, or to the limits of a desired maximum send-to-write delay time, or another criteria. Later arriving commands that seek to write to sequential media addresses earlier than the current address may be rejected, for example, by the converter 108 returning an error message to the host application 102. As an optional enhancement to step 406c, if the converter 108 determines that the current command is a retry of a prior successful Write command, the converter 108 may discard the command and provide a status report of "good" back to the host application 102.

In contrast to steps 404a, 404b, another possibility is that the converter 108 receives a command other than an explicit addressing read/write command (step 404c). For instance, the command of step 404 may be an implicit read/write command, a repositioning command, etc. In this case, the converter 108 reviews the contents of the command to monitor the current tape position, updates the record 108d, and then passes the command to the drive 110 (step 406d). For example, if the command is an implicit write command that advances the tape by two logical blocks, then the converter 108 advances the current media position record 108a by two blocks. "Relative" commands such as Space and Reposition, however, are not self-descriptive in the amount that they change tape position. More particularly, a reposition command endeavors to reposition the tape to the next file marker. In such cases, step 406d involves the converter 108 passing the command on to the drive 110, waiting until the drive 110 completes the command, querying the drive 110 for the current tape address (or other logical position), then updating the record 108d. This query may be done by issuing a Read Position command, for instance. It may also be necessary to query the drive, for example, when Unit Attention conditions imply that a logical block address has changed. The reported current tape position is then used to update the record 108a.

Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

What is claimed is:

1. A method for interfacing an implicit addressing sequential media device and at least one host compatible with explicit addressing sequential media devices, comprising operations of, responsive to host issuance at explicit addressing media access commands, performing operations comprising converting content of the explicit addressing media access commands to form implicit addressing media access commands, passing the implicit addressing media access commands to the implicit addressing sequential media device, and responsive to host issuance of device capability queries, reporting to the host that the device utilizes explicit addressing.

2. The method of claim 1, the operations further comprising:
responsive to host issuance of commands other than explicit addressing media access commands, relaying said commands to the device substantially free of any modification.

3. The method of claim 1, the operation of converting the explicit addressing media access commands into implicit media access commands comprising:
receiving an explicit addressing media access command including an instruction, address, and data length;
removing the address and retaining the instruction and data length.

4. The method of claim 1, the operations further comprising, for each command passed to the implicit addressing sequential media device, monitoring a current sequential media address being read or written by performing one of the following operations:
examining contents of the host issued commands; querying the device to ascertain current sequential media address.

5. The method of claim 4, the operation of converting the explicit addressing media access commands into implicit addressing media access commands further comprising:
determining whether repositioning is needed of the device's current sequential media address;
if repositioning is needed, prior to the operation of passing the implicit addressing media access commands to the device, issuing a media reposition command to the device.

6. The method of claim 1, the operations further comprising, for each host issued command, monitoring a current sequential media address by performing operations comprising:
for each command, determining whether the command involves a number of logical blocks of data;
if the command involves a number of logical blocks of data, updating a record of current sequential media address according to the number of logical blocks of data;
if the command does not involve a number of logical blocks of data, communicating with the device to ascertain current sequential media address.

7. The method of claim 1, the operations responsive to host issuance of explicit addressing media access commands further comprising:
queuing host issued explicit addressing media access commands;
converting content of the host issued explicit addressing media access commands to form counterpart implicit addressing media access commands;
passing the queued implicit addressing media access commands to the device in an order dictated by their explicit addressing counterparts.

8. A signal-bearing medium tangibly embodying a program of machine-readable instructions executable by a digital processing apparatus to perform operations for interfacing an implicit addressing sequential media device and at least one host compatible with explicit addressing sequential media devices, the operations comprising, responsive to host issuance of explicit addressing media access commands, performing operations comprising converting content of the explicit addressing media access commands to form implicit addressing media access commands, passing the implicit addressing media access commands to the implicit addressing sequential media device, and responsive to host issuance of device capability queries, reporting to the host that the device utilizes explicit addressing.

9. The medium of claim 8, the operations further comprising:
responsive to host issuance of commands other than explicit addressing media access commands, relaying said commands to the device substantially free of any modification.

10. The medium of claim 8, the operation of converting the explicit addressing media access commands into implicit addressing media access commands comprising:
receiving an explicit addressing media access command including an instruction, address, and data length;
removing the address and retaining the command and data length.

11. The medium of claim 8, the operations further comprising, for each command passed to the implicit addressing sequential media device, monitoring a current sequential media address being read or written by performing one of the following operations:
examining contents of the host issued commands; querying the device to ascertain current sequential media address.

12. The medium of claim 11, the operation of converting the explicit addressing media access commands into implicit addressing media access commands further comprising:
determining whether repositioning is needed of the device's current sequential media address;
if repositioning is needed, prior to the operation of passing the implicit addressing media access commands to the device, issuing a media reposition command to the device.

13. The medium of claim 8, the operations further comprising, for each host issued command, monitoring a current sequential media address by performing operations comprising:
for each command, determining whether the command involves a number of logical blocks of data;
if the command involves a number of logical blocks of data, updating a record of current sequential media address according to the number of logical blocks of data;
if the commend does not involve a number of logical blocks of data, communicating with the device to ascertain current sequential media address.

14. The medium of claim 8, the operations responsive to host issuance of explicit addressing media access commands further comprising:
queuing host issued explicit addressing media access commands;
converting content of the host issued explicit addressing media access commands to form counterpart implicit addressing media access commands;
passing the queued implicit addressing media access commands to the device in an order dictated by their explicit addressing counterparts.

15. A sequential storage media command converter for use between at least one host and at least one implicit addressing sequential media device, comprising:
- an input;
- an output;
- a digital data processing machine interposed between the input and output, programmed to interface the implicit addressing sequential media device and the host by performing operations comprising, responsive to host issuance of explicit addressing media access commands, performing operations comprising converting content of the explicit addressing media access commands to form implicit addressing media access commands, passing the implicit addressing media access commands to the implicit addressing sequential media device, and responsive to host issuance of device capability queries, reporting to the host that the device utilizes explicit addressing.

16. The converter of claim 15, the digital data processing machine being programmed such that the operations further comprise:
- responsive to host issuance of commands other than explicit addressing media access commands, relaying said commands to the device substantially free of any modification.

17. The converter of claim 15, the digital data processing machine being programmed Such that the operation of converting the explicit addressing media access commands into implicit addressing media access commands comprises:
- receiving an explicit addressing media access command including an instruction, address, and data length;
- removing the address and retaining the instruction and data length.

18. The converter of claim 15, the digital data processing machine being programmed such that the operations further comprise, for each command passed to the implicit addressing sequential media device, monitoring a current sequential media address being read or written by performing one of the following operations:
- examining contents of the host issued commands; querying the device to ascertain current sequential media address.

19. The converter of claim 18, the digital data processing machine being programmed such that the operation of converting the explicit addressing media access commands into implicit addressing media access commands further comprises:
- determining whether repositioning is needed of the device's current sequential media address;
- if repositioning is needed, prior to the operation of passing the implicit addressing media access commands to the device, issuing a media reposition command to the sequential media device.

20. The converter of claim 15, the digital data processing machine being programmed such that the operations further comprise, for each host issued command, monitoring a current sequential media address by performing operations comprising:
- for each command, determining whether the command involves a number of logical blocks of data;
- if the command involves a number of logical blocks of data, updating a record of current sequential media address according to the number of logical blocks of data;
- if the command does not involve a number of logical blocks of data, communicating with the device to ascertain current sequential media address.

21. The converter of claim 15, the digital data processing machine being programmed such that the operations responsive to host issuance of explicit addressing media access commands further comprise:
- queuing host issued explicit addressing media access commands;
- converting content of the host issued explicit addressing media access commands to form counterpart implicit addressing media access commands;
- passing the queued implicit addressing media access commands to the device in an order dictated by their explicit addressing counterparts.

* * * * *